United States Patent Office 3,371,045
Patented Feb. 27, 1968

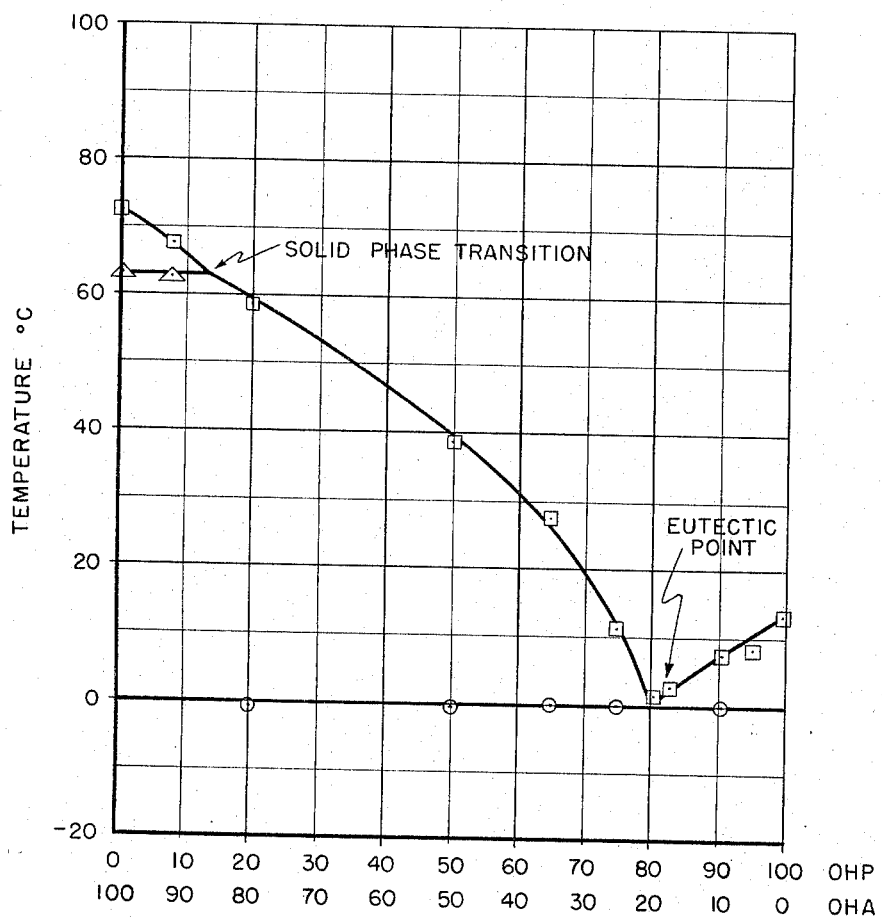

3,371,045
EUTECTIC MIXTURE OF OCTAHYDROANTHRA-
CENE AND OCTAHYDROPHENANTHRENE
Irl N. Duling, West Chester, Pa., assignor to Sun Oil
Company, Philadelphia, Pa., a corporation of New
Jersey
Filed Feb. 23, 1965, Ser. No. 434,541
2 Claims. (Cl. 252—73)

ABSTRACT OF THE DISCLOSURE

A eutectic mixture of octahydroanthracene and octahydrophenanthrene is obtained by combining about twenty parts of the former with about eighty parts of the latter. The eutectic has a melting point of about 0° C.

---

This invention is a eutectic mixture of sym-octahydroanthracene, herein OHA, and sym-octahydrophenanthrene, herein OHP. As is apparent from FIGURE 1, which is a phase diagram of the OHA-OHP system, the eutectic has a composition of about 80% OHP and 20% OHA and has a freezing point of 0° C.

The OHA-OHP eutectic has numerous uses. For example, it can be employed as the temperature indicating material in any of the many known temperature indicating devices which depend for their operation upon the melting of a material at a constant temperature. See, e.g., the devices shown in U.S. Patents 3,002,385, 2,938,384, and 2,053,967. The eutectic is also useful as a heat transfer medium, particularly in moderating nuclear reactions because the eutectic has good resistance to radioactive emissions of various types.

The OHA-OHP eutectic can be prepared by mixing liquid OHA (melting point=74° C.) and liquid OHP (melting point=16.7° C.) in the eutectic proportions until a homogeneous mixture is obtained. The OHA and OHP can be obtained in any convenient manner, one suitable procedure being by the partial hydrogenation of anthracene and phenanthrene respectively at a temperature of 200°–450° C., a hydrogen pressure of 150–300 atmospheres, and in the presence of a catalyst comprising an oxide or sulfide of cobalt, molybdenum, tungsten, or copper, the amount of catalyst preferably being 0.1–1.0% by weight of the anthracene or phenanthrene. These partial hydrogenation techniques are described in French Patent 1,365,023.

Alternatively, OHA and OHP can be prepared by the HF–BF$_3$ catalyzed disproportionation of tetralin, the reaction products being mainly OHA, OHP, and benzene. This method, which is described in copending application Serial No. 388,693, filed August 10, 1964, now abandoned, is carried out, e.g., by a procedure which involves contacting tetralin with 10 moles liquid HF per mole of tetralin and 0.6 mole BF$_3$ per mole of tetralin at a temperature of 50° C. for a period of 2 hours. The reaction product mixture is quenched in water and the organic layer is then decanted. OHA and OHP are then separately recovered from the organic layer by fractional distillation, preferably under vacuum, e.g., 0.1 mm. Hg. At this pressure they distill off between about 80° and 85° C.

The OHA-OHP eutectic can also be obtained from a mixture containing OHA and OHP in proportions other than the eutectic proportions, e.g., from a mixture containing OHA and OHP in a weight ratio of 60 OHA:40 OHP. This is, in fact, about the ratio in which OHA and OHP are formed in the HF–BF$_3$ catalyzed disproportionation of tetralin. Hence if in that process the OHA and OHP are distilled off together from the reaction product rather than separately as in the above description, a mixture containing OHA and OHP in a 60:40 ratio is obtained. Such a 60:40 mixture is entirely liquid above 47° C. (see FIGURE 1). If cooled to slightly below 47° C. solid material crystallizes therefrom. Further cooling results in crystallization of additional solid until finally at 0° C. the entire mass is solid. At a temperature just slightly above 0° C., i.e., just before the entire mass turns solid, the liquid phase has essentially the eutectic composition and the eutectic is isolated by separating the solid from the liquid by, say, filtration.

I claim:
1. Eutectic mixture of octahydroanthracene and octahydrophenanthrene having a melting point of 0° C.
2. Eutetic according to claim 1 containing about 80% by weight sym-octahydrophenanthrene and about 20% by weight sym-octahydroanthracene.

References Cited

UNITED STATES PATENTS

| 3,063,927 | 11/1962 | Ort et al. | 252—74 |
| 3,086,932 | 4/1963 | Bolt et al. | 260—668 |
| 3,221,071 | 11/1965 | Stahly | 260—668 |

LEON D. ROSDOL, *Primary Examiner.*

S. D. SCHWARTZ, *Assistant Examiner.*